Nov. 24, 1925.

G. A. BURNHAM

ELECTRIC SWITCHING APPARATUS

Filed May 17, 1922    2 Sheets-Sheet 2

1,562,739

Inventor,
George A. Burnham
by

Patented Nov. 24, 1925.

1,562,739

UNITED STATES PATENT OFFICE.

GEORGE A. BURNHAM, OF SAUGUS, MASSACHUSETTS, ASSIGNOR, BY MESNE ASSIGNMENTS, TO CONDIT ELECTRICAL MANUFACTURING COMPANY, A CORPORATION OF MASSACHUSETTS.

ELECTRIC SWITCHING APPARATUS.

Application filed May 17, 1922. Serial No. 561,756.

*To all whom it may concern:*

Be it known that I, GEORGE A. BURNHAM, a citizen of the United States, residing at Saugus, in the county of Essex and State of Massachusetts, have invented an Improvement in Electric Switching Apparatus, of which the following is a specification.

This invention relates to cell-type electric switches and has for an object to provide means to ventilate the switch and keep it free from objectionable gases and particularly explosive gaseous mixtures.

A further object is to provide a single ventilating means for all the switches of a multi-phase switching apparatus and, preferably, to dispose said ventilating means without the cells and in some conveniently accessible location.

A further object is to provide flexible conduits detachably connecting the ventilating means with the interior of the switches in the cells whereby the switch may be readily disconnected from the ventilating means for removal from the cells.

A further object is generally to improve the construction and operation of electric switches.

Certain features of this invention are disclosed in my co-pending application filed March 25, 1922, Serial No. 546,647.

Figure 1:
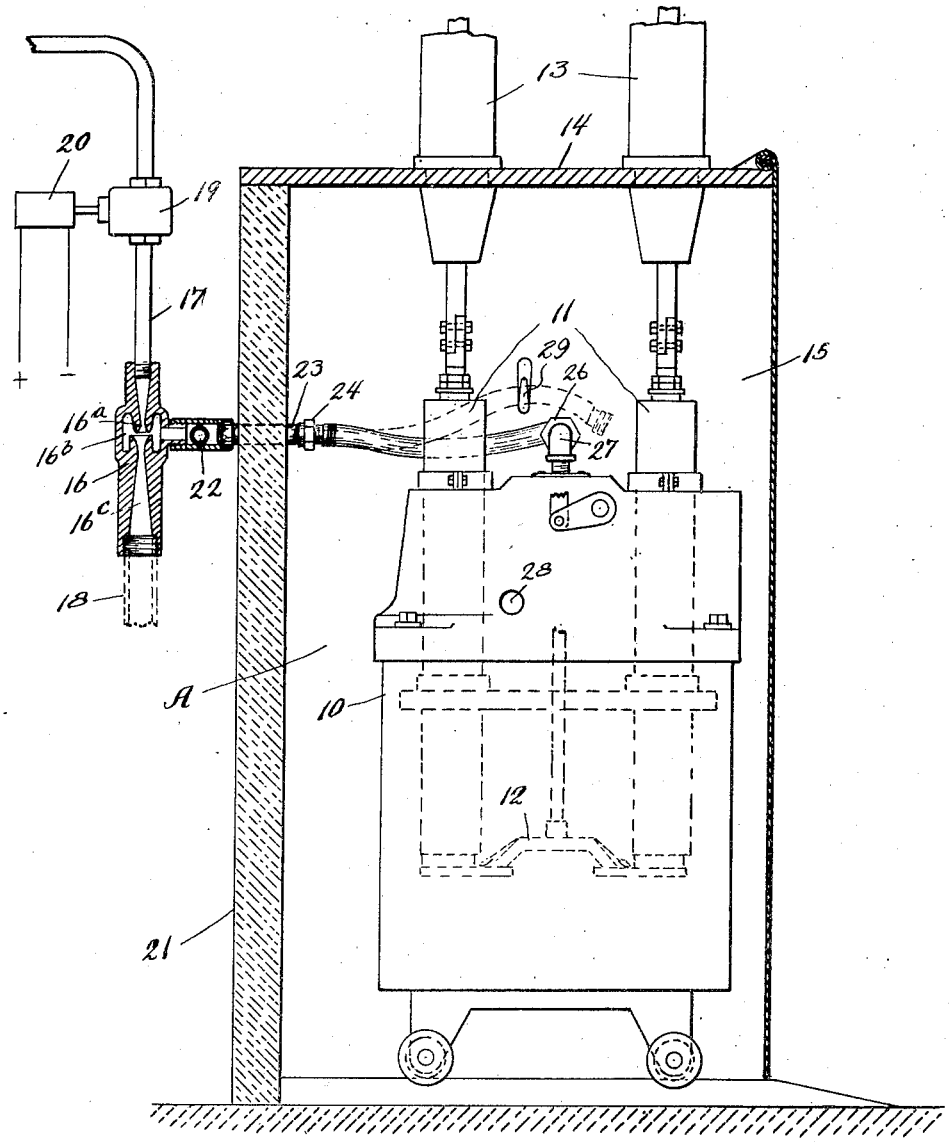
Fig. 1 is a sectional elevation through a cell containing an oil immersed electric switch with which my invention is associated.
Figure 2:
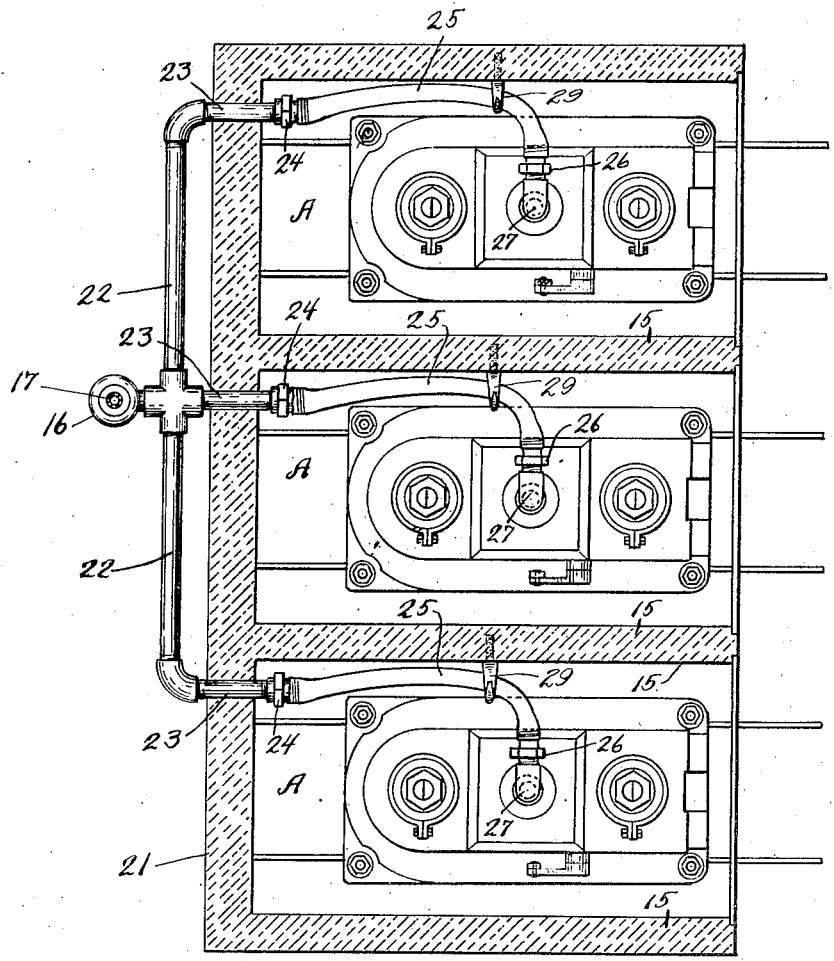
Fig. 2 is a plan view of the switching apparatus for a three phase electric circuit, and the ventilating apparatus associated therewith, with the cell walls shown in section.

As here shown the cell-type movably-supported, electric switch may comprise the wheeled casing 10 adapted to contain oil or other equivalent fluid in which the stationary switch member 11 and movable switch members 12 are immersed, and an expansion space above the oil. The switch may be contained in the cell A, and the circuit leads may be extended through bushings 13 carried by the top wall 14 of the cell into the cell and connected to the stationary switch members. Three switches are here shown and are contained in separate cells and separated from adjacent switches by the cell division walls 15.

The ventilating apparatus includes piping extended outwardly from each cell to a common ventilating device disposed without the cells. The ventilating device may be any suitable means for setting up a flow of air through the piping and, preferably, is an air ejector 16. Said ejector may be actuated by high pressure air supplied from a suitable source of supply through the supply pipe 17; and the jet of air flowing through the high pressure nozzle 16$^a$ of the ejector acts in more or less the usual manner to entrain air from the chamber 16$^b$ of the ejector and move it forcibly into and through the expanding portion 16$^c$ of the ejector and discharge it into the atmosphere or into a pipe 18.

The ejector may be arranged for continuous operation or, and preferably, it may be arranged for intermittent operation by suitable apparatus which may control the opening and closing of a valve 19 in the supply pipe 17, and said valve is here shown as electrically-actuated by means of the solenoid 20.

Preferably the ejector is disposed externally of the cells A and adjacent the rear wall 21 thereof, although it may be otherwise disposed. The chamber 16$^b$ of the ejector may be in communication with a pipe 22 which may extend along the rear wall 21 of and between the cells, and branch pipes 23 may extend from said pipe through the rear wall 22 and each into a cell A. Said pipes may terminate within the cells and adjacent the rear wall thereof in couplings 24. The conduits between said branch pipes 23 and the switches contained within the cells are preferably flexible pipes or tubes 25, and couplings 26 may connect said flexible pipes detachably with the gas space within the switches, through the L's 27 disposed between the stationary switch members 13 and extended laterally of the switches.

As thus arranged, the single ejector 16 may ventilate the entire bank of switches and operate to draw fresh air into the switches through the vent holes 28, one of which is shown in Fig. 1, and sweep out the gases in the expansion spaces above the oil in the switches.

By reason of the flexible pipes 25 considerable latitude is obtained in the positioning of the switches within the cells and when the pipes are disconnected from the switches, by breaking of the couplings 26 for the removal of the switches from the cells, said pipes 25 may be suspended on hooks 29 carried by the division walls 15 of the cells in a position convenient for subsequent re-connection to the switches.

It will be noted that the L's 27 provide means whereby the gases may be withdrawn from the side of the switch casings and connections with the flexible pipe 25 may be made easily.

An air ejector is especially to be preferred as the switch ventilating device as it has no moving parts, and can be operated by air, a supply of which is usually available at the switching stations.

I claim:

1. A cell construction comprising walls forming an enclosing cell for an electric switch, a suction switch-ventilating device externally disposed adjacent and carried by a wall of said cell, and a ventilating conduit having communication with said switch-ventilating device and supported by and extended through the cell wall and having means to establish ventilating communication with the interior of an electric switch contained within the cell.

2. The combination of an isolating partition wall, an enclosed electric switch disposed on one side of and adjacent said wall, a suction switch-ventilating device comprising an ejector disposed on the other side of and adjacent said wall, and a communicating conduit extended through said wall and having communication with said ejector and the interior of said electric switch.

3. Electric switching apparatus comprising the combination of a plurality of enclosing cells, electric switches contained therein, conduits arranged for communication with the interior of said switches and extended through and outwardly beyond the enclosing cells, a pipe connecting the extended ends of the aforesaid conduits; and a suction switch ventilating device for all switches disposed externally of said cells and arranged in communication with said pipe.

4. Electric switching apparatus comprising the combination of a plurality of enclosing cells, electric switches contained therein, conduits arranged for communication with the interior of said switches extended through and outwardly beyond the enclosing cells, a pipe connecting the extended ends of the aforesaid conduits, and a suction switch ventilating device comprising an air-actuated ejector common to all switches connected with said pipe to exhaust gases from the switches through said conduits and pipe.

5. Cell construction for electric switches comprising a switch-enclosing cell, a conduit extended through a wall of and into the cell having means for communication with the interior of a switch disposed within the cell, and a suction switch-ventilating device disposed adjacent and externally of said cell in communication with said conduit and arranged to draw gases through said conduit from the switch.

6. Cell construction for electric switches comprising a switch-enclosing cell, a conduit extended through a wall of and into the cell having means for communication with the interior of a switch disposed within the cell, a suction switch-ventilating device comprising an air-actuated ejector disposed adjacent and externally of said cell in communication with said conduit and arranged to draw gases through said conduit.

7. Cell construction for electric switches comprising a plurality of switch-enclosing cells, conduits extended through walls of and into the cells having means for communication with the interior of switches disposed within the cells, a pipe connecting all of said conduits externally of the cells, and a suction switch-ventilating device disposed adjacent and externally of said cells and connected with said pipe and arranged to draw gases through said pipe and conduits from the switches.

8. Cell construction for electric switches comprising a plurality of switch-enclosing cells, conduits extended through walls of and into the cells having means for communication with the interior of switches disposed within the cells, a pipe connecting all of said conduits externally of the cells, a suction switch-ventilating device comprising an air ejector disposed adjacent and externally of said cells and connected with said pipe and arranged to draw gases through said pipe and conduits, and a source of high pressure air arranged to operate said ejector.

9. Electric switching apparatus comprising a cell, an enclosed electric switch of the movable type contained within the cell, switch-ventilating apparatus including a suction device disposed externally of the cell having a conduit extended through a cell wall into the cell, and a flexible conduit connected to the inner end of said pipe having means for detachable connection with the switch and arranged to be placed in communication with the interior of the switch.

10. Electric switching apparatus comprising a cell, an enclosed electric switch of the movable type contained within the cell, switch-ventilating apparatus including a suction device disposed externally of the cell having a conduit extended through a cell wall into the cell, a flexible conduit arranged to continue said pipe within the cell, said switch having a connecting member extended laterally of the switch, and means to connect said conduit and connecting member.

11. Electric switching apparatus comprising a cell, an enclosed electric switch of the movable type contained within the cell, switch-ventilating apparatus including a suction device disposed externally of the cell having a conduit extended through a cell wall into the cell, a flexible conduit arranged to continue said pipe within the cell, said switch having a connecting member extended laterally of the switch, and means to connect said conduit and connecting member detachably.

12. Electric switching apparatus comprising a cell, an enclosed electric switch of the movable type contained within the cell, switch-ventilating apparatus including an air ejector disposed externally of the cell having a conduit extended through a cell wall into the cell, and a flexible conduit connected to the inner end of said pipe having means for detachable connection with the switch and arranged to be placed in communication with the interior of the switch.

In testimony whereof, I have signed my name to this specification.

GEORGE A. BURNHAM.